United States Patent [19]

Baker et al.

[11] Patent Number: 4,719,083

[45] Date of Patent: Jan. 12, 1988

[54] COMPOSITION USEFUL AS CORROSION INHIBITOR, ANTI-SCALANT AND CONTINUOUS BIOCIDE FOR WATER COOLING TOWERS AND METHOD OF USE

[75] Inventors: Gary L. Baker, Covington, Ky.; Ronald J. Christensen, Montgomery, Ohio

[73] Assignee: Chemed Corporation, Cincinnati, Ohio

[21] Appl. No.: 12,604

[22] Filed: Feb. 9, 1987

Related U.S. Application Data

[63] Continuation of Ser. No. 728,287, Apr. 29, 1985, abandoned.

[51] Int. Cl.$^4$ .................. C23F 11/16; C23F 11/14
[52] U.S. Cl. ..................................... 422/15; 422/16; 210/698; 210/699; 210/700; 210/764; 252/180; 252/389.21; 252/389.23; 252/389.54; 424/126; 514/642
[58] Field of Search ............... 210/698, 699, 760, 764; 252/180, 389.21, 389.22, 389.23, 389.54, 391, 392; 422/15, 16; 424/126; 71/67; 528/422; 514/642

[56] References Cited

U.S. PATENT DOCUMENTS

| | | | |
|---|---|---|---|
| 3,332,871 | 7/1967 | Robinson | 71/67 X |
| 3,404,165 | 10/1968 | Budde, Jr. et al. | 252/392 X |
| 3,658,710 | 4/1972 | Puckorius et al. | 210/698 X |
| 3,771,989 | 11/1973 | Pera et al. | 71/67 |
| 3,898,336 | 8/1975 | Rembaum et al. | 514/642 X |
| 3,933,427 | 1/1976 | Bohnsack et al. | 252/389.23 X |
| 4,018,592 | 4/1977 | Buckman et al. | 71/67 |
| 4,026,815 | 5/1977 | Kallfass et al. | 252/389.23 X |
| 4,101,441 | 7/1978 | Hwa et al. | 252/389.2 |
| 4,149,969 | 4/1979 | Robitaille et al. | 252/389.23 X |
| 4,176,059 | 11/1979 | Suzuki | 252/391 X |
| 4,208,344 | 6/1980 | Dingwall et al. | 252/389.23 X |
| 4,237,090 | 12/1980 | DeMonbrun et al. | 252/387 X |
| 4,474,684 | 10/1984 | Roos et al. | 252/392 |
| 4,497,713 | 2/1985 | Geiger | 210/699 |

FOREIGN PATENT DOCUMENTS

6831  1/1976  Japan .............................. 252/389.23

OTHER PUBLICATIONS

*Disinfection, Sterilization, and Preservation;* Seymour R. Block; Third Edition; (1983) Leg & Feblger, Philadelphia; pp. 309–329.

Chapter 5 "Microbiological Control"; *Drew Principles of Industrial Water Treatment;* pp. 85–108.

McCoy, James W.; *The Chemical Treatment of Cooling Water;* 2nd Ed.; Chemical Publishing Co., pp. 109–110, 116, 118–120, 223.

Buckman Laboratories, Inc.; "WSCP" Product Label; WSCP For Algae Control in Swimming Pools; 2/6/82, PA-E-WSCP-W2.

Buckman Laboratories, Inc.; "WSCP" Product Data; WSCP For Algae Control In Swimming Pools"; Bulletin No. EBUS 8/7/80.

Buckman Laboratories, Inc.; "WSCP" Product Data; WSCP A Broad Spectrum Microbicide Concentrate; 6/1/77 Bulletin E6US.

*Primary Examiner*—Matthew A. Thexton
*Attorney, Agent, or Firm*—Wood, Herron & Evans

[57] ABSTRACT

An all-in-one treatment composition for a water cooling tower includes a water soluble aromatic azole corrosion inhibitor such as benzotriazole, an organophosphorous antiscalant and a polymeric quaternary ammonium compound. The polymeric quaternary ammonium compound has the following general formula:

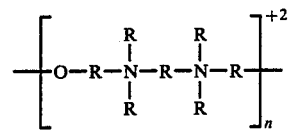

The composition is suitable for use at low level continuous applications rates. The polymeric quaternary ammonium compound is also suitable for use at low concentration as a continuous biocide/biostat. This compound does not suffer from the acclimatization typically encountered when one biocide is used on a continuous low level basis.

33 Claims, No Drawings

COMPOSITION USEFUL AS CORROSION INHIBITOR, ANTI-SCALANT AND CONTINUOUS BIOCIDE FOR WATER COOLING TOWERS AND METHOD OF USE

This is a continuation of application Ser. No. 728,287, filed Apr. 29, 1985, now abandoned.

BACKGROUND

Water cooling systems, particularly water cooling towers, require continuous maintenance in order to avoid fouling caused by sludge, scale and microorganisims, and corrosion. These problems are treated by adding various chemicals to the water cooling towers.

One class of compounds useful as dispersants, antiscaling agents and corrosion inhibitors are organophosphorous compounds, particularly organophosphorous carboxylic acids and the phosphonates. These organic phosphorus compounds have the ability to complex metal ions by sequestration or threshold treatment. They also form inhibitive films along metal surfaces. This prevents formation of the crystalline structure in scale. Phosphonates are a well defined class of threshold inhibitors used to prevent scale formation. Typically used phosphonates include aminomethylenephosphonic acid and 1-hydroxyl ethylidene-1,1-diphosphonic acid. A commonly employed organophosphorous carboxylic acid (phosphenite) is 2-phosphonobutane- 1,2,4-tricarboxylic acid which can be purchased from Bayer AG.

Alkali and alkaline earth metal molybdate salts are superior corrosion inhibitors to chromate and nitrite salts used at higher concentrations. Sodium molybdate is an anodic inhibitor and is the most commonly used molybdate inhibitor.

Also used for corrosion inhibition are the aromatic azoles. These are specific corrosion inhibitors for copper and its alloys. They are chemisorbed on the metal surfaces and are capable of excellent protection at a minimal dosage of 1 to 2 parts per million. Generally included within the aromatic azoles are benzotriazole, tolyltriazole, and mercaptobenzothiazole.

Organophosphorous carboxylic acids, phosphonates and azoles are used in combination to provide a corrosion and scale inhibition program. Functionally these are all anionic in solution and therefore generally quite compatible.

In addition to corrosion and scale inhibitors and dispersants, water cooling towers are generally treated with certain biocides or biostats to prevent or inhibit algae, fungi and bacteria. Two general types of these are oxidizing and nonoxidizing. Typical oxidizing biocides are $ClO_2$, chlorine and chlorine release compounds such as chlorinated isocyanurates, hypochlorites and chlorinated hydantoins. Quaternary ammonium compounds are the primary nonoxidizing biocides and biostats. The quaternary ammonium salts are cationic surface active chemicals which are most effective against algae and bacteria in alkaline pH ranges.

One particular class of quaternary ammonium complexes are polymeric quaternary ammonium salts. These complexes are generally nontoxic and accordingly safer to use. They are formed by reacting a bis tertiary amine with a dihalo compound or a hydroxy halocompound. Several of these compounds are currently used to treat water cooling towers. One such product is WSCP from Buckman Laboratories which is poly[oxyethylene(dimethylimminio)ethylene(dimethylimminio)ethylenedichloride]. This product is used as a swimming pool algicide at two parts per million(ppm) as a maintenance dose and 5 to 8ppm to rid pools of heavy objectionable algae growth. Swimming pools are more easily treated than water cooling towers. The chlorination of swimming pools and other biocidal treatment prevents acclimatization. Further, swimming pools are not actively aerated. Water cooling towers inherently aerate the water which promotes growth of aerobic microorganisms. The manufacturers of WCSP recommend use of WCSP at 20 to 40 parts per million of active product as a biocide for water cooling towers.

Another polymeric quaternary ammonium compound is Mirapol A-15. This product is poly[N-[3(dimethylammonio)propyl]-N'-[3-(ethyleneoxyethylenedimethylammonio)propyl] urea dichloride]. This is inhibitory against certain bacteria at 100 parts per million. A third polymeric quaternary ammonium compound is ETC-PQ from Onyx Chemical Company which is α-4-[1 tris(2-hydroxy ethyl)ammonium chloride-2-butenyl]-poly[1 dimethylammonium chloride-2-butenyl]-ω-tris(2 hydroxyethyl)ammonium chloride. This also acts as a bacteriostat.

Quaternary ammonium salts are excellent biocides for use in water cooling towers. However because quaternary ammonium compounds are cationic in nature and when combined with corrosion inhibitors, dispersants and antiscalants which are anionic in nature, the compounds tend to salt out via chemical reaction thereby destroying functionality. The corrosion inhibitors and antiscalants are used continuously and remain effective even though used continuously. Biocides and biostats on the other hand are not used continuously. Bacteria and other microorganisms can acclimatize to a particular biocide rendering the biocide totally ineffective. This is particularly a problem when low levels of a biocide are used as is required for continuous application. Of course at extremely high concentration, certain biocides would be effective on a continuous basis. But this would be environmentally objectionable and economically unfeasible. Other biocides and biostats are totally ineffective at low levels used in continuous treatment. For these reasons biocides and biostats are generally applied periodically in high concentration, slug doses which kill a high proportion of bacteria or algae. A typical treatment for a water cooling tower will use multiple slug doses of different biocides to prevent acclimatization to any particular biocide.

SUMMARY OF THE INVENTION

The present invention is premised upon the discovery that a particular quaternary ammonium complex, a poly[oxyalkylene(dialkylimminio)alkylene(dialkylimminio)] salt, is effective as a continuous biocide/biostat at low levels.

The invention is further premised on the discovery that this quaternary ammonium compound is compatible at high concentrations with organophosphorous carboxylic acid dispersants and scale inhibitors, as well as with molybdate corrosion inhibitors and azole type corrosion inhibitors.

Thus the present invention provides a means to continuously treat a water cooling system, particularly a water cooling tower, with one composition which prevents corrosion, scaling and acts as a bacteriostat and an algicide. These and other advantages of the present invention will be appreciated in light of the detailed description.

DETAILED DESCRIPTION

According to the present invention an all-in-one treatment agent for a water cooling system includes a polymeric quaternary ammonium compound as a biocide/biostat, an organophosphorous carboxylic acid compound which acts as a scale control agent, dispersant and corrosion inhibitor and an azole type corrosion inhibitor. These are provided in high concentrations for storage and shipment and are applied at low level concentration on a continuous basis in a water cooling tower.

Further the unique polymeric quaternary ammonium compound used in the invention can be used alone as a low level continuous bacteriostat and algicide.

For use in the present invention the polymeric quaternary ammonium compound is a poly[oxyalkylene(-dialkylimminio)alkylene(dialkylimminio)alkylene] compound having the following general formula:

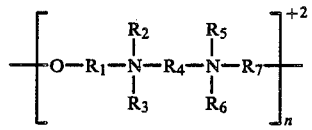

wherein:

$R_1$, $R_4$ and $R_7$ are $C_1-C_{10}$ alkylene and preferably $C_1-C_3$ alkylene;

$R_2$, $R_3$, $R_5$ and $R_6$ represent $C_1-C_5$ alkyl and preferably methyl; and n is 5-12 and preferably 7-10.

The +2 charge is preferably offset by anionic halogen atoms preferably $Cl^-$.

The preferred polyquaternary ammonium compound for use in the present invention is poly[oxyethylene(-dimethylimminio)ethylene(dimethylimminio)ethylenedichloride]. The terminal groups of the polymer may vary but generally should be hydrogen or a halogen such as chlorine. This compound is produced by reacting dichloroethyl ether with the following compound in an aqueous medium via a rate/temperature controlled reaction:

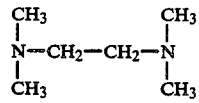

The amount of polymeric quaternary ammonium compound(active) used in the present invention will generally be about 5%-60% and preferably 10% based on the total amount of organophosphorous compound, azole corrosion inhibitor and polymeric quaternary ammonium compound.

The antiscalant dispersant of the present invention is one or more organic phosphorous compounds. Organophosphorous antiscalants are a known class of compounds. The two preferred compounds are phosphonates and organophosphorous carboxylic acids and their salts. Suitable phosphonates are water soluble phosphonates which have the following general formula:

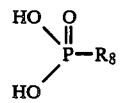

wherein $R_8$ represents $C_1-C_5$ alkyl or substituted alkyl such as amine substituted alkyl and phosphonic acid substituted alkyl. Preferred phosphonates are polyphosphonates where $R_8$ is substituted with one or more phosphonate groups. The most commonly used is 1-hydroxyethylidene-1, 1-diphosphonic acid(HEDP).

The organophosphorous carboxylic acid compounds suitable for use in the present invention are the water soluble organic phosphorous carboxylic acids typically used as antiscalants in the water treatment industry. These have the following general formula:

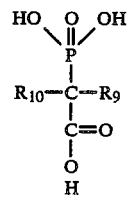

wherein $R_9$ and $R_{10}$ represent hydrogen, $C_1-C_5$ alkyl or $C_1-C_5$ alkyl substituted by an amine, carboxylic acid group or ester group. In use, since the final composition is alkaline, the compound will be present as alkali or alkaline earth metal salts or $C_1-C_5$ alkyl esters.

The relative percentage of organophosphorous antiscalant based on the total amount of poly quaternary ammonium compound, azole corrosion inhibitor and organophosphorous compound in the present formulation should generally range from 20% to 85%(actives) preferably 60%. At higher concentrations it tends to salt out.

The organophosphorous antiscalants can be added as a combination of phosphonates and organophosphorous carboxylic acid for applications encountering hard water. In such applications the two organophosphorous antiscalants preferred are 1-hydroxyethylidene-1, 1-diphosphonic acid(HEDP) and 2-phosphonobutane-1, 2,4 tricarboxylic acid(PBS-AM).

Further the all in one treatment composition of the present invention includes a water soluble aromatic azole type corrosion inhibitor. These include benzotriazole, $C_1-C_{10}$ alkylbenzotriazoles such as tolyltriazole and thiozoles such as mercaptobenzothiozole. Preferred azoles are benzotriazole and tolyltriazole.

The aromatic azole corrosion inhibitors should be present in a percentage of 2 to 20 based on combined amounts of polyquaternary ammonium compound, organophosphorous compound, and azole.

In the composition of the present invention the relative percentages of organophosphorous compound, aromatic azole and polyquaternary ammonium compound are provided so that in use in a water cooling tower when the polyquaternary ammonium compound is present at a concentration of less than or equal to about 15 ppm, the concentration of organophosphorous compound and aromatic azole will be high enough to provide effective corrosion and scale inhibition. The use levels are usually at least about 0.5ppm for the aromatic azole and at least about 5ppm for the organophosphorous compound.

A preferred composition for use in the present invention would include 32% poly[oxyethylene(diethylimminio) ethylene(dimethylimminio)ethylenedichloride] as the quaternary, 24% HEDP and 38% PBS-AM as the organophosphorous and 6% benzotriazole, based on the total actives content.

Further the above compositions may also include a base in an amount effective to establish the pH at about 7 to 8.5. Suitable bases include the alkali metal hydroxides particularly sodium and potassium hydroxide.

In use in a water cooling tower, it is desirable to have the following approximate concentrations of components:

|  | Range | Preferred |
| --- | --- | --- |
| aromatic azole | .5-5 ppm | 1 ppm |
| Organophosphorous antiscalant (Total) | 5-15 ppm | 9.7 ppm |
| HEDP | 0-15 ppm | 3.7 ppm |
| PBS-AM | 0-15 ppm | 6 ppm |
| Poly Quaternary | 2-15 ppm | 5 ppm |

For water cooling towers which employ low hardness or low alkalinity water, a modified all-in-one treatment composition can be used. Specifically, a molybdate corrosion inhibitor can be added. The molybdates are compatible with the polyquaternary compound used in the present invention. Because this formulation is adapted for use in soft water, it can be used with a single organophosphorous component. Accordingly PBS-AM may be employed alone as the organophosphorous antiscalant.

In the composition of the present invention the relative percentages of organophosphorous compound, molybdate aromatic azole and polyquaternary ammonium compound are provided so that in use in a water cooling tower when the polyquaternary ammonium compound is present at a concentration of less than or equal to about 15ppm the concentration or organophosphorous compound, molybdate and aromatic azole will be high enough to provide effective corrosion and scale inhibition. The use levels are usually at least about 0.5ppm for the aromatic azole and at least about 5ppm for the organophosphorous compound.

In this formulation the aromatic azole is present at 1 to 15% of total active and preferably 7%, the organophosphorous compound is present at 5% to 60% or higher of total actives and preferably 11%; the polyquaternary compound is present at 5% to 40% of total active preferably 16% and the Na molybdate is present in 30% to 80% of total active and preferably 70%.

In use in a water cooling tower it is desirable to have the following concentration of individual components:

|  | Range | Preferred |
| --- | --- | --- |
| aromartic azole | .5-5 | 1 ppm |
| Organophosphorous (preferably PBS-AM) | 5-15 ppm | 6 ppm |
| Polyquaternary Ammonium Compound | 2-15 ppm | 5 ppm |
| Na Molybdate | 10-50 ppm | 40 ppm |

The poly[oxyalkylene(dialkylimminio)alkylene(dialkylimminio)] compound previously described is useful alone as a continuous biocide/biostat at low levels of use. For use in the present invention this polyquaternary ammonium compound should be added to a water cooling tower at 2-15ppm and preferably 3-5ppm.

The water cooling system should be maintained with this concentration of the polyquaternary ammonium compound on a continuous basis. Under these conditions acclimatization by algae and bacteria does not occur. The preferred polyquaternary ammonium compound is poly[oxyethylene(dimethylimminio)ethylene(dimethylimminio)ethylene dichloride].

According to the present invention a poly[oxyalkylene(dialkylimminio)alkylene(dialkylimminio)] can be used at low levels to provide a continuous biostat/biocide treatment of cooling system water or it can be incorporated into an all in one water cooling system treatment system to control corrosion, sludge buildup, scale formation and microorganisms.

Having disclosed our invention, We claim:

1. A composition adapted to prevent scale and corrosion and to act as a continuous bacteriostat and algicide, comprising:

2% to 20% by weight of an aromatic azole corrosion inhibitor;

20% to 85% by weight of an organophosphorous antiscalant; and

5% to 60% of a polymeric quaternary ammonium compound having the following general formula:

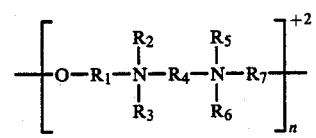

wherein
$R_1$, $R_4$, and $R_7$ represent $C_1$-$C_{10}$ alkylene; and
$R_2$, $R_3$, $R_5$, $R_6$ represent $C_1$-$C_5$ alkyl; and
n represents 5-12;
wherein the +2 charge is offset by anionic halogen;
said aromatic azole and said organophosphorous antiscalant provided in amounts relative to said polymeric quaternary ammonium compound which are effective to provide corrosion inhibition and antiscaling activity in a water cooling system when said polymeric quaternary ammonium compound is present at a use concentration from at least about 2ppm to about 15ppm.

2. The composition claimed in claim 1 wherein said organophosphorous antiscalant is selected from the group consisting of water soluble phosphonates and water soluble organophosphorous carboxylic acids.

3. The composition claimed in claim 2 wherein said aromatic azole is selected from the group consisting of 1,2,3 benzotriazole, tolyltriazole and mercaptobenzothiozole.

4. The composition claimed in claim 1 wherein said organophosphorous antiscalant is selected from the group consisting of 2-phosphonobutane-1,2,4-tricarboxylic acid, 1-hydroxyethylidene-1,1-diphosphonic acid and mixtures thereof.

5. The composition claimed in claim 1 wherein said polymeric quaternary ammonium compound comprises poly[oxyethylene(dimethylimminio)ethylene(dimethylimminio)ethylene dichloride].

6. The composition claimed in claim 1 wherein said aromatic azole is selected from the group consisting of 1,2,3 benzotriazole, tolyltriazole and mercaptobenzothiozole and said organophosphorous antiscalant is selected from the group consisting of 2-phosphonobutane-1,2,4-tricarboxylic acid, 1-hydroxyethylidene-1,1-diphosphonic acid and mixtures thereof and said polyquaternary ammonium compound comprises poly[oxyethylene(dimethylimminio)ethylene(dimethylimminio)ethylene dichloride].

7. The composition claimed in claim 2 wherein said phosphonate antiscalant has the following general formula:

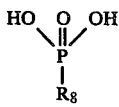

wherein $R_8$ represents $C_1$-$C_{10}$ alkyl, amine substituted alkyl and phosphonic acid substituted alkyl and said organophosphorous carboxylic acid has the following general formula:

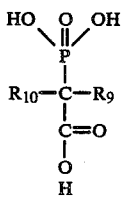

wherein $R_9$ and $R_{10}$ represent hydrogen $C_1$-$C_5$ alkyl, carboxylic acid substituted $C_1$-$C_5$ alkyl, amine substituted $C_1$-$C_5$ alkyl and ester substituted $C_1$-$C_5$ alkyl.

8. A method of treating water in a water cooling system comprising adding to water in said cooling system the composition claimed in claim 1 in an amount effective to establish a concentration of aromatic azole at 0.5-5 ppm;
a concentration of organophosphorous antiscalent at 5-15 ppm; and
a concentration of polymeric quaternary ammonium compound at 2-15 ppm.

9. A method of treating water in a water cooling system comprising adding to water in said cooling tower the composition claimed in claim 2 in an amount effective to establish a concentration of aromatic azole at 0.5-5ppm;
a concentration of organophosphorous antiscalant at 5-15ppm; and
a concentration of polymeric quaternary ammonium compound at 2-15ppm.

10. A method of treating water in a water cooling tower comprising adding to water in said cooling tower the composition claimed in claim 3 in an amount effective to establish a concentration of aromatic azole at 0.5-5ppm;
a concentration of organophosphorous antiscalant at 5-15ppm; and
a concentration of polymeric quaternary ammonium compound at 2-15ppm.

11. A method of treating water in a water cooling tower comprising adding to water in said cooling tower the composition claimed in claim 4 in an amount effective to establish a concentration of aromatic azole at 0.5-5ppm;
a concentration of organophosphorous antiscalant at 5-15ppm; and
a concentration of polymeric quaternary ammonium compound at 2-15ppm.

12. A method of treating water in a water cooling tower comprising adding to water in said cooling tower the composition claimed in claim 5 in an amount effective to establish a concentration of aromatic azole at 0.5-5 ppm;
a concentration of organophosphorous antiscalant at 5-15 ppm; and
a concentration of polymeric quaternary ammonium compound at 2-15 ppm;

13. A method of treating water in a water cooling tower comprising adding to water in said cooling tower the composition claimed in claim 6 in an amount effective to establish a concentration of aromatic azole at 0.5-5ppm;
a concentration of organophosphorous antiscalant at 5-15ppm; and
a concentration of polymeric quaternary ammonium compound at 2-15ppm.

14. A method of treating water in a water cooling tower comprising adding to water in said cooling tower the composition claimed in claim 7 in an amount effective to establish a concentration of aromatic azole at 0.5-5ppm;
a concentration of organophosphorous antiscalant at 5-15ppm; and
a concentration of polymeric quaternary ammonium compound at 2-15ppm.

15. A composition adapted to prevent scale, corrosion and to act as a bacteriostat and algicide comprising 2% to 20% of an aromatic azole selected from the group consisting of 1,2,3-benzotriazole, tolytriazole and mercaptobenzothiozole;
20% to 85of an organophosphorous antiscalant selected from the group consisting of 2-phosphonobutane-1,2,4-tricarboxylic acid and 1-hydroxyethylidene-1,1-diphosphonic acid and mixtures thereof; and
5% to 60% of poly[oxyethylene(dimethylimminio) ethylene(dimethylimminio)ethylene dichloride].

16. A method of treating water in a water cooling tower comprising adding to water in said cooling tower the composition claimed in claim 15 in an amount effective to establish a concentration of aromatic azole at 0.5-5 ppm;
a concentration of organophosphorous antiscalant at 5-15 ppm; and
a concentration of polymeric quaternary ammonium compound at 2-15 ppm;

17. A composition adapted to prevent scale and corrosion and to act as a bacteriostat and algicide, comprising
1% to 15% of an aromatic azole corrosion inhibitor;
1% to 60% of a water soluble organophosphorous antiscalant;
30% to 805 of a molybdate corrosion inhibitor; and
5% to 40% of a biocide comprising a polymeric quaternary ammonium compound having the following general formula

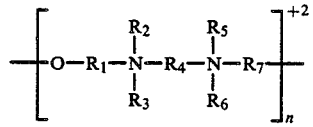

wherein
$R_1$, $R_4$, and $R_7$ represent $C_1$-$C_{10}$ alkylene; and $R_2$, $R_3$, $R_5$, $R_6$ represent $C_1$–$C_5$ alkyl; and
n represents 5–12;
wherein the +2 charge is offset by anionic halogen;
said aromatic azole and said organophosphorous antiscalant and said molybdate corrosion inhibitor provided in amounts relative to said polymeric quaternary ammonium compound which are effective to provide corrosion inhibition and antiscaling activity in a water cooling tower when said polymeric quaternary ammonium compound is present at a use concentration from about 2ppm to about 15ppm.

18. The composition claimed in claim 17 wherein said organophosphorous antiscalant is selected from the group consisting of phosphonate antiscalants and organophosphorous carboxylic acids.

19. The composition claimed in claim 18 wherein said phosphonate antiscalant has the following general formula:

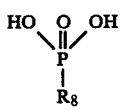

wherein $R_8$ represents $C_1$–$C_5$ alkyl, amine substituted $C_1$–$C_5$ alkyl, and $C_1$–$C_5$ phosphonic acid substituted alykl
and said organophosphorous carboxylic acid has the following general formula:

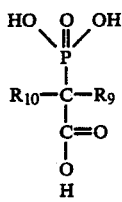

wherein $R_9$ and $R_{10}$ represents hydrogen $C_1$–$C_5$ alkyl, carboxylic acid substituted $C_1$–$C_5$ alkyl, amine substituted $C_1$–$C_5$ alkyl and ester substituted $C_1$–$C_5$ alkyl 20. The composition claimed in claim 19 wherein said organophosphorous antiscalant is selected from the group consisting of
2-phosphonobutane-1,2,4-tricarboxylic acid,
1-hydroxyethylidene-1,1-diphosphonic acid and mixtures thereof.

21. The composition claimed in claim 20 wherein said polyquaternary ammonium compound comprises poly[oxyethylene(dimethylimminio)ethylene(dimethylimminio)ethylene dichloride].

22. The composition claimed in claim 17 wherein said aromatic azole is selected from the group consisting of 1,2,3 benzotriazole, tolyltriazole and mercaptobenzothiozole.

23. The composition claimed in claim 22 wherein said molybdate is selected from the group consisting of alkali and alkaline earth metal molybdates.

24. The composition claimed in claim 23 wherein said molybdate is sodium molybdate.

25. A method of treating water in a water cooling tower comprising adding to water in said cooling tower the composition claimed in claim 18 in an amount effective to establish a concentration of aromatic azole at 0.5–5ppm;
a concentration of molybdate corrosion inhibitor at 10 to 50ppm;
a concentration of organophosphorous antiscalant at 5–15ppm; and
a concentration of polymeric quaternary ammonium compound at 2–15ppm.

26. A method of treating water in a water cooling tower comprising adding to water in said cooling tower the composition claimed in claim 19 in an amount effective to establish a concentration of aromatic azole at 0.5–5ppm;
a concentration of molybdate corrosion inhibitor at 10 to 50 ppm;
a concentration of organophosphorous antiscalant at 5–15ppm; and
a concentration of polymeric quaternary ammonium compound at 2–15ppm.

27. A method of treating water in a water cooling tower comprising adding to water in said cooling tower the composition claimed in claim 20 in an amount effective to establish a concentration of aromatic azole at 0.5–5ppm;
a concentration of molybdate corrosion inhibitor at 10 to 50ppm;
a concentration of organophosphorous antiscalant at 5–15ppm; and
a concentration of polymeric quaternary ammonium compound at 2–15ppm.

28. A method of treating water in a water cooling tower comprising adding to water in said cooling tower the composition claimed in claim 21 in an amount effective to establish a concentration of aromatic azole at 0.5–5ppm;
a concentration of molybdate corrosion inhibitor at 10 to 50ppm;
a concentration of organophosphorous antiscalant at 5–15ppm; and
a concentration of polymeric quaternary ammonium compound at 2–15ppm.

29. A method of treating water in a water cooling tower comprising adding to water in said cooling tower the composition claimed in claim 22 in an amount effective to establish a concentration of aromatic azole at 0.5–5ppm;
a concentration of molybdate corrosion inhibitor at 10 to 50ppm;
a concentration of organophosphorous antiscalant at 5–15ppm; and
a concentration of polymeric quaternary ammonium compound at 2–15ppm.

30. A method of treating water in a water cooling tower comprising adding to water in said cooling tower the composition claimed in claim 23 in an amount effective to establish a concentration of aromatic azole at 0.5–5ppm;
a concentration of molybdate corrosion inhibitor at 10 to 50ppm;
a concentration of organophosphorous antiscalant at 5–15ppm; and
a concentration of polymeric quaternary ammonium compound at 2–15ppm.

31. A method of treating water in a water cooling tower comprising adding to water in said cooling tower the composition claimed in claim 24 in an amount effective to establish a concentration of aromatic azole at 0.5–5ppm;
a concentration of molybdate corrosion inhibitor at 10 to 50ppm;

a concentration of organophosphorous antiscalant at 5-15ppm; and a concentration of polymeric quaternary ammonium compound at 2-15ppm.

32. A composition adapted to prevent scale, corrosion and to act as a bacteriostat and algicide comprising;

1% to 15% of an aromatic azole corrosion inhibitor selected from the group consisting of 1,2,3 benzotriazole, tolyltriazole and mercaptobenzothiozole;

5% to 60% of a organophosphorous antiscalant selected from the group consisting of 2-phosphonobutane-1,2,4-tricarboxylic acid and 1-hydroxyethylidene-1,1-diphosphonic acid;

30% to 80% of sodium molybdate;

5% to 40% of poly[oxyethylene(dimethylimminio)ethylene(dimethylimminio)ethylene dichloride].

33. A method of treating water in a water cooling tower comprising adding to water in said cooling tower the composition claimed in claim 32 in an amount effective to establish a concentration of aromatic azole at 0.5-5 ppm;

a concentration of molybdate corrosion inhibitor at 10 to 50ppm;

a concentration of organophosphorous antiscalant at 5-15ppm; and a concentration of polymeric quaternary ammonium compound at 2-15ppm.

* * * * *